United States Patent
Bengochea et al.

(10) Patent No.: US 9,215,201 B2
(45) Date of Patent: Dec. 15, 2015

(54) PROVIDING AN UNSEEN MESSAGE COUNT ACROSS DEVICES

(71) Applicant: Microsoft Corporation, Redmond, WA (US)

(72) Inventors: Sebastian Bengochea, Sammamish, WA (US); Juan Vicente Esteve Balducci, Sammamish, WA (US); Juan D. Ferré, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 371 days.

(21) Appl. No.: 13/896,140

(22) Filed: May 16, 2013

(65) Prior Publication Data

US 2014/0280635 A1    Sep. 18, 2014

Related U.S. Application Data

(60) Provisional application No. 61/779,515, filed on Mar. 13, 2013.

(51) Int. Cl.
*H04L 12/58* (2006.01)

(52) U.S. Cl.
CPC .............. *H04L 51/22* (2013.01); *H04L 12/58* (2013.01)

(58) Field of Classification Search
CPC .............................. H04L 51/22; H04L 12/58
See application file for complete search history.

(56) References Cited

U.S. PATENT DOCUMENTS

| | | |
|---|---|---|
| 8,090,785 B2 | 1/2012 | Kirkpatrick |
| 8,285,258 B2 | 10/2012 | Schultz et al. |
| 8,577,967 B1* | 11/2013 | Chavez et al. ................ 709/206 |
| 2003/0154256 A1* | 8/2003 | Hadano et al. ................ 709/206 |
| 2008/0109448 A1 | 5/2008 | Aboel-Nil et al. |
| 2008/0306972 A1 | 12/2008 | Wilkin et al. |
| 2011/0314118 A1 | 12/2011 | Hardy et al. |
| 2012/0054533 A1 | 3/2012 | Shi et al. |
| 2012/0149342 A1* | 6/2012 | Cohen et al. ............... 455/412.2 |
| 2012/0204110 A1* | 8/2012 | Cabral ........................... 715/727 |
| 2014/0026187 A1* | 1/2014 | Johnson et al. ................... 726/3 |

OTHER PUBLICATIONS

"International Search Report and Written Opinion Issued in PCT Application No. PCT/US2014/021074", Mailed Date: Mar. 16, 2015, 13 Pages.

(Continued)

*Primary Examiner* — Ebrahim Golabbakhsh
(74) *Attorney, Agent, or Firm* — Louise Bowman; Aaron Hoff; Micky Minhas

(57) ABSTRACT

Embodiments are directed to providing an indication of unseen email messages to a mobile device user, to establishing an unseen email message count and to maintaining a consistent unseen email message count across multiple mobile devices. In one scenario, a computer system receives subscription data that subscribes a user to email push notifications. The subscription data includes a token ID and a timestamp. The computer system determines that a new email message has arrived at the user's inbox and accesses the user's email inbox to determine the number of unseen email messages (which includes the number of email messages that have been received at the user's inbox and have not been viewed or marked as read using another email client since the time listed on the timestamp). The computer system also sends a push notification with the number of unseen email messages to each of the user's subscribed mobile devices.

20 Claims, 5 Drawing Sheets

(56) References Cited

OTHER PUBLICATIONS

"Push Notifications", Retrieved on: May 13, 2013, Available at: http://www.warp.ly/mobile-marketing/push-notifications.
Hanold, Daniel, "Push Notifications Drupal", Published on: Feb. 14, 2012, Available at: http://drupal.org/project/push_notifications.
Friedman, Lex, "Review: Mailbox for iPhone belongs in your dock", Published on: Feb. 7, 2013, Available at: http://www.macworld.com/article/2027388/review-mailbox-for-iphone-belongs-in-your-dock.html.
"Message Notify 1.0.0.1", Published on: May 27, 2009, Available at: http://handheld.softpedia.com/get/Internet-Utilities/Email/Message-Notify-78178.shtml.
"Apple Push Notifications Service API & C#", Published on: Jul. 6, 2011, Available at: http://www.nitrix-reloaded.com/2011/07/06/apple-push-notifications-service-api-c/.
"IBM Worklight—Unified Push Notifications", Published on: Jul. 17, 2012, Available at: http://www-01.ibm.com/software/mobile-solutions/worklight/features/push/.

\* cited by examiner

PROVIDING AN UNSEEN MESSAGE COUNT ACROSS DEVICES

CROSS-REFERENCE TO RELATED APPLICATIONS

This application claims priority to and the benefit of U.S. Provisional Application Ser. No. 61/779,515, filed on Mar. 13, 2013, entitled "Providing an Unseen Message Count Across Devices", which application is incorporated by reference herein in its entirety.

BACKGROUND

Computers have become highly integrated in the workforce, in the home, in mobile devices, and many other places. Computers can process massive amounts of information quickly and efficiently. Software applications designed to run on computer systems allow users to perform a wide variety of functions including business applications, schoolwork, entertainment and more. Software applications are often designed to perform specific tasks, such as word processor applications for drafting documents, or email programs for sending, receiving and organizing email.

In some cases, an email application may allow users to access their email either locally or remotely. For example, a personal information management application that provides access to a user's email, contacts and calendar may have a version designed for local installation and local access, as well as a remote version that allows users to use the application on a browser remotely, or from a mobile device. Thus, a user may access his or her email locally on their desktop or laptop computer system, and then later access their email remotely through a browser or via a mobile device such as a phone. Keeping new email notifications consistent across the local and remote versions of the application may introduce complications.

BRIEF SUMMARY

Embodiments described herein are directed to providing an indication of unseen email messages to a mobile device user, to establishing an unseen email message count and to maintaining a consistent unseen email message count across multiple mobile devices. In one embodiment, a computer system receives, from a mobile device user, subscription data that subscribes the user to email push notifications. The subscription data includes a token ID for a mobile device associated with the user and a timestamp that indicates the last time the mobile device user's email inbox was accessed. The computer system determines that a new email message has arrived for the user at an email inbox for the user and accesses the user's email inbox to determine the number of unseen email messages. The number of unseen email messages includes the number of email messages that have been received at the user's inbox and have not been viewed or marked as read using another email client since the time listed on the timestamp. The computer system also sends a push notification to each of the user's subscribed mobile devices, where the push notification provides the number of unseen email messages.

In another embodiment, a computer system determines that a timestamp has been established for a subscribed mobile device user. The timestamp indicates the last time the users' email inbox was accessed, and is established upon receiving subscription information from the mobile device user that includes a token ID for each subscribed mobile device. The computer system receives email messages for the user at the user's email inbox and determines that the received email messages have been read by the user using a non-mobile email client application. The computer system then receives at least one subsequent email message at the user's email inbox and sends a push notification to the user's mobile device notifying the user that they have at least one unseen email message. Unseen email messages include those email messages that have been received at the user's inbox and have not been viewed or marked as read using another email client since the time listed on the timestamp.

In yet another embodiment, a computer system performs a method similar to that above for maintaining a consistent unseen email message count across multiple mobile devices. However, in this embodiment, the computer system sends a push notification to each of the user's subscribed mobile devices with the number of unseen email messages. The computer system then determines that at least one of the unseen email messages is subsequently accessed using a second, different mobile device and updates the timestamp with the time the user's email inbox was last accessed by the second, different mobile device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
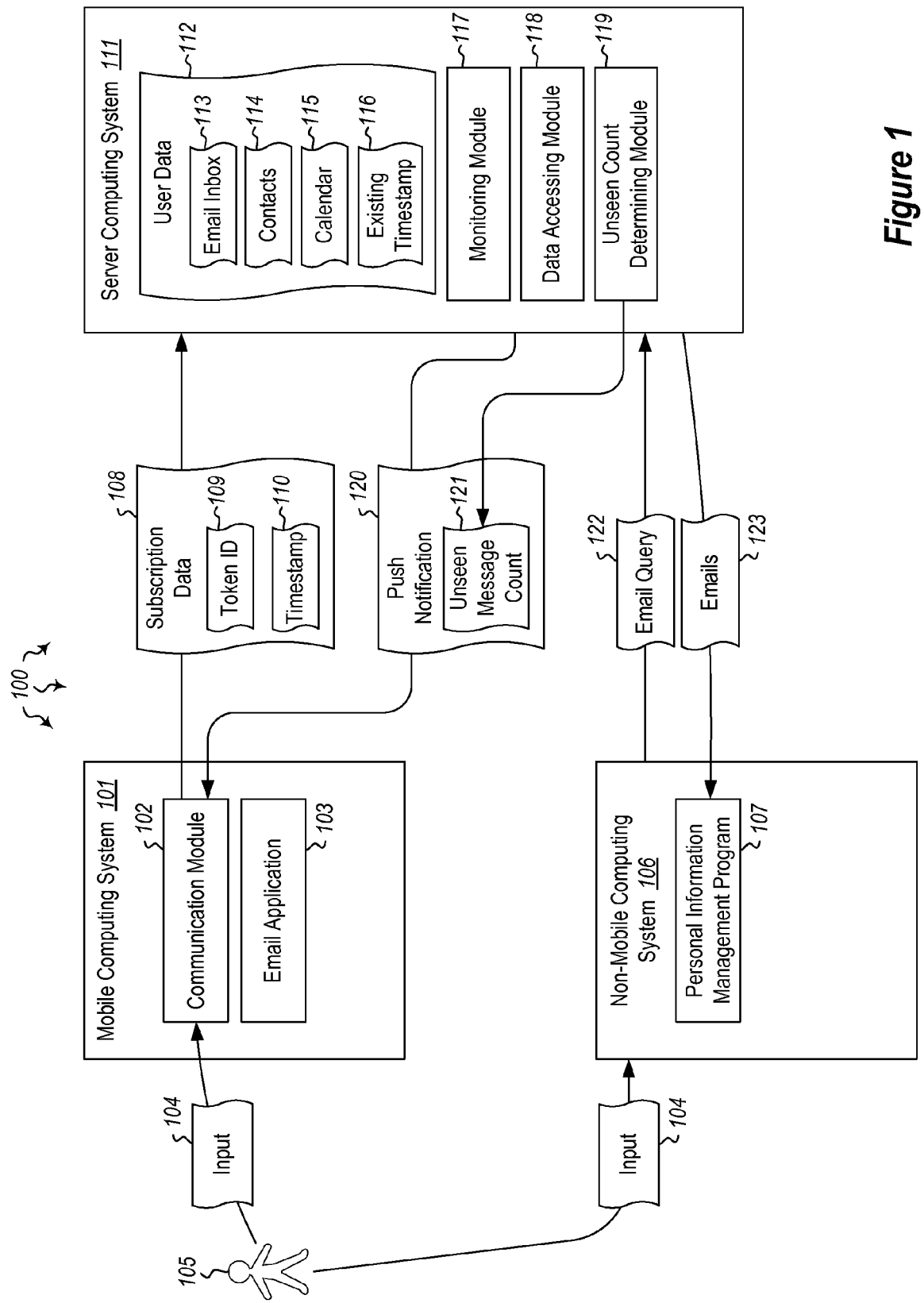
FIG. 1 illustrates a computer architecture in which embodiments described herein may operate including providing an indication of unseen email messages to a mobile device user.

Embodiments described herein are directed to providing an indication of unseen email messages to a mobile device user, to establishing an unseen email message count and to maintaining a consistent unseen email message count across multiple mobile devices. In one embodiment, a computer system receives, from a mobile device user, subscription data that subscribes the user to email push notifications. The subscription data includes a token ID for a mobile device associated with the user and a timestamp that indicates the last time the mobile device user's email inbox was accessed. The computer system determines that a new email message has arrived for the user at an email inbox for the user and accesses the user's email inbox to determine the number of unseen email messages. The number of unseen email messages includes the number of email messages that have been received at the user's inbox and have not been viewed or marked as read using another email client since the time listed on the timestamp. The computer system also sends a push notification to each of the user's subscribed mobile devices, where the push notification provides the number of unseen email messages.

In another embodiment, a computer system determines that a timestamp has been established for a subscribed mobile device user. The timestamp indicates the last time the users' email inbox was accessed, and is established upon receiving subscription information from the mobile device user that includes a token ID for each subscribed mobile device. The computer system receives email messages for the user at the user's email inbox and determines that the received email messages have been read by the user using a non-mobile email client application. The computer system then receives at least one subsequent email message at the user's email inbox and sends a push notification to the user's mobile device notifying the user that they have at least one unseen email message. Unseen email messages include those email messages that have been received at the user's inbox and have not been viewed or marked as read using another email client since the time listed on the timestamp.

In yet another embodiment, a computer system performs a method similar to that above for maintaining a consistent unseen email message count across multiple mobile devices. However, in this embodiment, the computer system sends a push notification to each of the user's subscribed mobile devices with the number of unseen email messages. The computer system then determines that at least one of the unseen email messages is subsequently accessed using a second, different mobile device and updates the timestamp with the time the user's email inbox was last accessed by the second, different mobile device.

The following discussion now refers to a number of methods and method acts that may be performed. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may comprise or utilize a special purpose or general-purpose computer including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computer system. Computer-readable media that store computer-executable instructions in the form of data are computer storage media. Computer-readable media that carry computer-executable instructions are transmission media. Thus, by way of example, and not limitation, embodiments described herein can comprise at least two distinctly different kinds of computer-readable media: computer storage media and transmission media.

Computer storage media includes RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium which can be used to store desired program code means in the form of computer-executable instructions, data or data structures and which can be accessed by a general purpose or special purpose computer.

A "network" is defined as one or more data links and/or data switches that enable the transport of electronic data between computer systems and/or modules and/or other electronic devices. When information is transferred or provided over a network (either hardwired, wireless, or a combination of hardwired or wireless) to a computer, the computer properly views the connection as a transmission medium. Transmission media can include a network which can be used to carry data or desired program code means in the form of computer-executable instructions or in the form of data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC"), and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that various embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. Embodiments described herein may also be practiced in distributed system environments where local and remote computer systems that are linked (either by hardwired data links, wireless data links, or by a combination of hardwired and wireless data links) through a network, each perform tasks (e.g. cloud computing, cloud services and the like). In a distributed system environment, program modules may be located in both local and remote memory storage devices.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Additionally or alternatively, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and other types of programmable hardware.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates a computer architecture 100 in which at least one embodiment may be employed. Computer architecture 100 includes mobile computer system 101. Mobile computer system 101 may be any type of local or distributed computer system, including a cloud computing system. The computer system includes various modules for performing a variety of different functions. For instance, the mobile computing system 101 includes a communications module 102 for communicating with other computer systems (e.g. server computing system 111). The communications module 102 may, at the request of user 105, send subscription data 108 to the server 111. The subscription data may subscribe the user 105 or the user's mobile device 101 to push notifications from the server. The subscription data 108 includes a token ID 109 that identifies the mobile device 101 and a timestamp 110 that indicates the last time the mobile device user's email inbox was accessed. The user's email inbox 113 may be one of many different parts of user data 112, including contacts 114 and calendar information 115. The token ID 109 may identify or be generated based on characteristics of the mobile device, and may be generated and/or provided by the mobile device's operating system.

The monitoring module 117 of server computing system 111 may be configured to monitor the user's email inbox for email messages as they are received. (It should be noted that the server computing system 111 may be any type of local or distributed computing system, including a cloud computing system). If the monitoring module 117 determines that a new email message has been received, the data accessing module 118 may be used to access the user's inbox 113. Then, based on the accessed data, the unseen count determining module 119 may determine the current unseen message count 121 and send that unseen message count to the mobile computing device 101 via a push notification 120. The unseen message count is defined herein as the number of email messages that have been received at the user's inbox 113 and have not been viewed or marked as read using another email client (e.g. personal information management program 107) since the time listed on the timestamp 110. This concept will be explained further below.

It should be noted that on many mobile devices, applications such as email application 103 may exist in various operational states. For example, if an application is in the foreground, the user 105 is currently using the application. The mobile device operating system typically does not handle notifications for the application. Notifications are passed directly to the application. In a typical application lifecycle, only a minor share is spent in this state. If an application is in the background, the user 105 has recently used the application and the application has a specified amount of time to continue executing in the background. As with the foreground state, the mobile device operating system typically handles notifications for applications in the background state. Similarly, only a minority of the application's lifecycle is spent in this state.

If an application is in a suspended state, the application is in memory with execution suspended. The mobile device operating system typically handles notifications for applications in this state. In contrast to the above states, the majority of an application's lifecycle is spent in this and/or the killed state. In the killed state, the application is not in memory and is not executing. The mobile device operating system handles notifications for the application.

As such, users may wish to know the status of their email inbox regardless of which state the email application 103 is currently in. In embodiments described herein, users are provided with a notification that they have received a new email while the application is not in the foreground. The new mail notification displays to users a number of unseen emails. As defined above, the unseen email count is different than a number of unread emails. The unseen email count is defined as the number of emails received in the inbox since the user last opened their inbox across all their email clients (including those on the mobile computing device 101 and on the non-mobile computing device 106).

A numeric identifier may be pushed along with the unseen message count 121 to the mobile computing device 101 when a new email is received in the user's inbox and the new email count for that instance of the email application is less than or equal to a maximum unseen message count. The maximum unseen count may be preset to a certain number, and it may or may not be configurable by an email administrator. The unseen message count is not decremented a unit at a time (such as based on reading an email) but is rather reset to zero unseen emails when the email application is brought to the foreground. When the email application is brought to the foreground, at least in some cases, a command is sent to the server to reset the unseen count on the server which shall in turn propagate to all other clients subscribed to get notified of changes against the user's mailbox. In other cases, when the email application is brought into the foreground, it will not receive email notifications. The change of timestamp (or reset) may occur the next time the email application is sent to the background. These concepts will be explained further below with regard to methods 200, 300 and 400 of FIGS. 2, 3 and 4, respectively.

Figure 2:
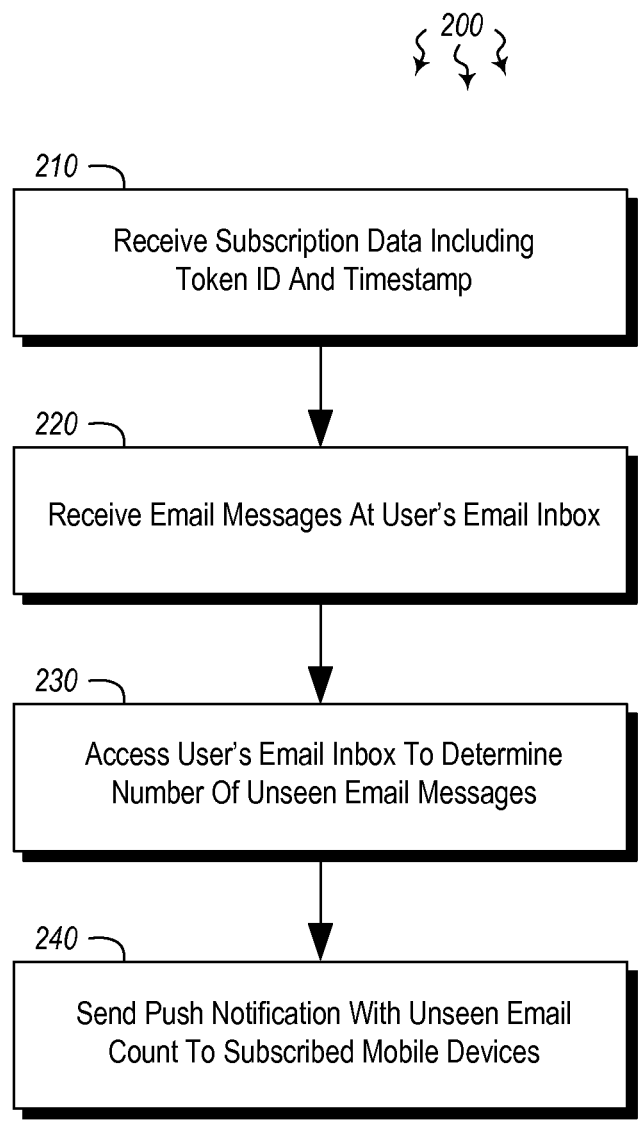
FIG. 2 illustrates a flowchart of an example method for providing an indication of unseen email messages to a mobile device user.
Figure 3:
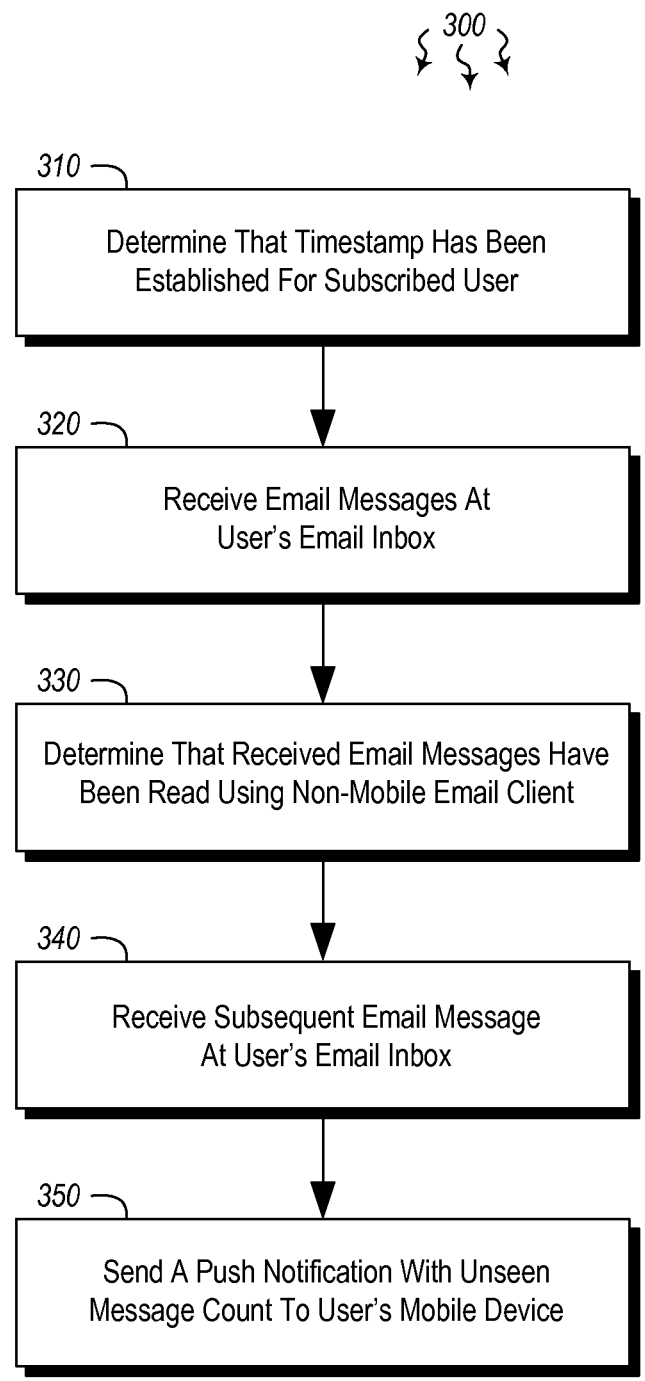
FIG. 3 illustrates a flowchart of an example method for establishing an unseen email message count.
Figure 4:
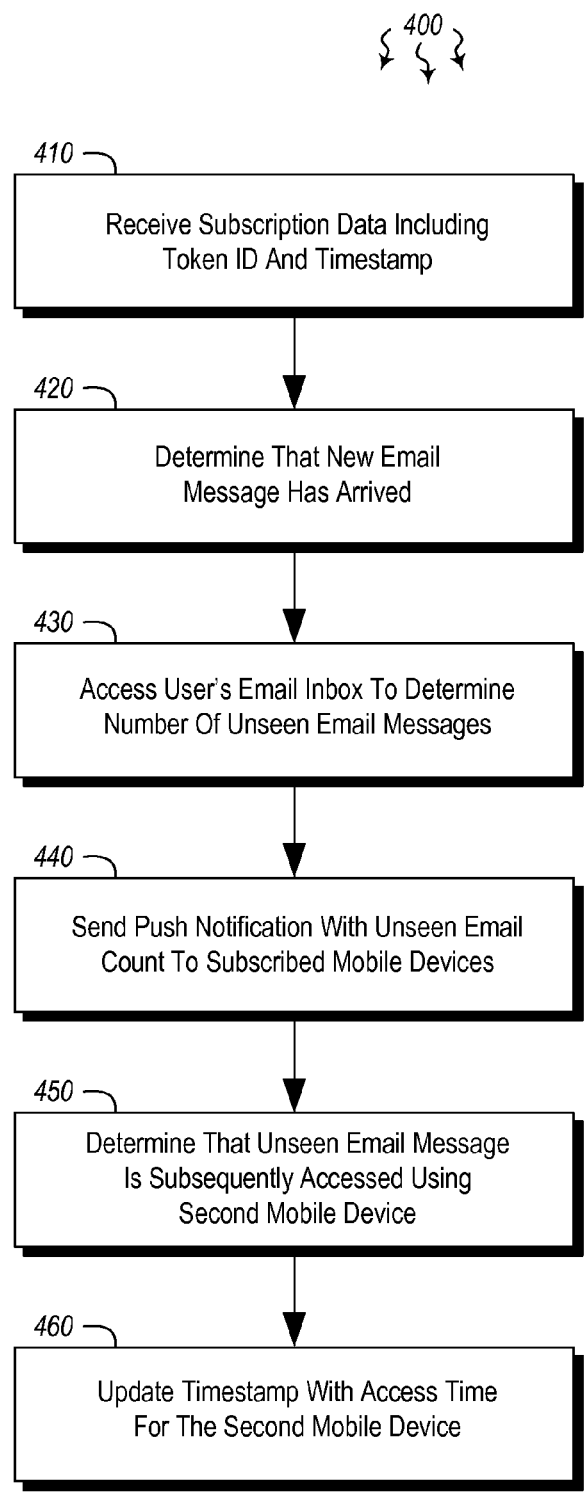
FIG. 4 illustrates a flowchart of an example method for maintaining a consistent unseen email message count across multiple mobile devices.

In view of the systems and architectures described above, methodologies that may be implemented in accordance with the disclosed subject matter will be better appreciated with reference to the flow charts of FIGS. 2, 3 and 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 2 illustrates a flowchart of a method 200 for providing an indication of unseen email messages to a mobile device user. The method 200 will now be described with frequent reference to the components and data of environment 100 of FIG. 1 and environment 500 of FIG. 5.

Method 200 includes an act of receiving, from a mobile device user, subscription data that includes a token ID for at least one mobile device associated with the user and a timestamp that indicates the last time the mobile device user's email inbox was accessed, the subscription data subscribing the user to email push notifications (act 210). Method 200 also includes an act of determining that a new email message has arrived for the user at an email inbox for the user (act 220). Still further, method 200 includes an act of accessing the user's email inbox to determine the number of unseen email messages, the number of unseen email messages comprising the number of email messages that have been received at the user's inbox and have not been viewed or marked as read using another email client since the time listed on the timestamp (act 230) and act of sending a push notification to each of the user's subscribed mobile devices, the push notification providing the number of unseen email messages (act 240).

The mobile device user's email inbox may be accessed using a personal information management application. The personal information management application 107 may be run on the mobile computer system 101 or on a non-mobile computer system 106. In some cases, the server computer system 111 may determine that a timestamp indicating the last time the user's email inbox was accessed already exists (e.g. existing timestamp 116). If the timestamp already exists, the server computer system may update the existing timestamp with the time on the timestamp in the received subscription information (e.g. timestamp 110). Thus, if a mobile device user 105 is accessing their email inbox 113 using their mobile device 101, the subscription data 108 sent by the mobile device will include timestamp information 110 which is used to update the existing timestamp 116.

Figure 5:
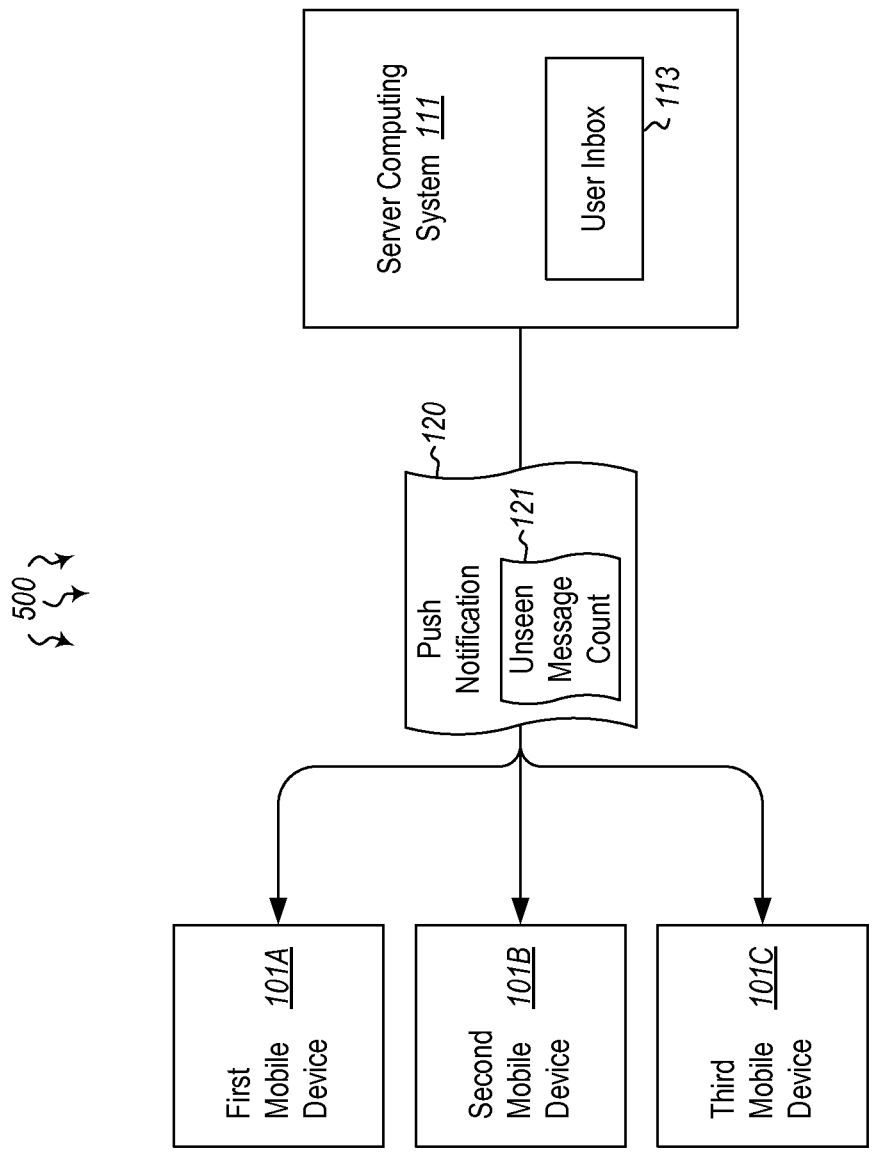
FIG. 5 illustrates a computing environment in which a push notification with an unseen message count is sent to one or more subscribed mobile devices.

Still further, in some cases, the server 111 may determine that an existing timestamp indicating the last time the user's email inbox was accessed is to be updated based on a second, different subscribed mobile device belonging to the user accessing the user's email inbox. Thus, for example, as shown in FIG. 5, the user 105 may log in to their inbox 113 using any of a variety of different mobile devices (including first mobile device 101A, second mobile device 101B and third mobile device 101C). The mobile devices may correspond to mobile phones, tablets, laptops or other mobile computing devices. When subscribing to and/or requesting email messages from the server, the mobile device's request includes a timestamp 110 that can be used to update the server's existing timestamp 116. After receiving the request, the server may update the existing timestamp with the time the user's email inbox was last accessed by the second, third, or other mobile device.

The existing timestamp may be updated, for example, when the user's personal information management application transitions to background mode. For instance, if user 105 is using an email application 103 (e.g. a personal information management application) on their mobile device, and that application goes into background mode (either because the application was exited or the mobile device was turned off), a timestamp may be created or updated on the server. Similarly, subscription data may be sent by the mobile device and received at the server each time the email application is brought into foreground mode on the mobile device.

In some cases, the push notification 120 sent to the user's subscribed mobile devices triggers a notification badge to be displayed, indicating the number of unseen email messages. Thus, the user can glance at their application icon, tile or other visual representation, and determine that they have an unseen message. The number of unseen messages will be consistently displayed and pushed (via notification 120) to each of the user's subscribed mobile devices (e.g. 101A-101C). In some embodiments, sending push notifications to each of the user's subscribed mobile devices includes sending the number of unseen email messages to a third party service. The third party service may be designed or configured to send the number of unseen email messages on to the user's mobile devices. Thus, the third party service may forward push notifications to each of the user's subscribed mobile devices. It should also be noted that, while push notifications have been described in conjunction with the embodiments above, other transports (e.g. a hanging or pending get channel) may be used as alternatives or in addition to push notifications.

FIG. 3 illustrates a flowchart of a method 300 for establishing an unseen email message count. The method 300 will now be described with frequent reference to the components and data of environment 100 of FIG. 1 and environment 500 of FIG. 5.

Method 300 includes an act of determining that a timestamp has been established for a subscribed mobile device user, the timestamp indicating the last time the users' email inbox was accessed, the timestamp being established upon receiving subscription information from the mobile device user that includes a token ID for each subscribed mobile device (act 310). Method 300 also includes an act of receiving one or more email messages for the user at the user's email inbox (act 320), an act of determining that the one or more received email messages have been read by the user using a non-mobile email client application (act 330), and an act of receiving at least one subsequent email message at the user's email inbox (act 340). Still further, method 300 includes an act of sending a push notification to the user's mobile device notifying the user that they have at least one unseen email message, the unseen email messages including those email messages that have been received at the user's inbox and have not been viewed or marked as read using another email client since the time listed on the timestamp (act 350).

In this manner, the user is notified of unseen email messages. As mentioned above, the number of unseen email messages is not simply an indication of unread or unviewed messages; rather, unseen email messages are those messages that are received at the user's inbox and have not been viewed or marked as read using a different email client since a specific time indicated on a timestamp.

For example, suppose in the above method 300, that at least one subsequent email message is received at the user's email inbox after the mobile device user has terminated the non-mobile email client application. Further, assume that the user has at least one email message was not read using the non-mobile email client application. In traditional systems, the user's email application 103 on their mobile device 101 would indicate at least two unread emails. In the embodiments described herein, however, the push notification indicates only the number of unseen email messages. As such, the push notification 120 would only include the messages not seen after the user logged out of or otherwise terminated the non-mobile email client application, as these are the only messages that are unseen. The other, unread messages have been seen by the user, but have not been read. Thus, the unseen message count 121 would include only the count of unseen messages, and would not include the seen, but unread email messages in the user's inbox.

The unseen message count 121 is pushed to each of the user's subscribed devices. Accordingly, in the example above, each of the user's subscribed devices in FIG. 5 would indicate an unseen message count of one. If the user accesses the unseen message on one of their mobile devices, the unseen count badge may be removed from the other devices. If the user receives another email while in the email application 103 on their mobile device, this message would be identified as a "seen" message and would not generate a push notification to other devices.

FIG. 4 illustrates a flowchart of a method 400 for maintaining a consistent unseen email message count across multiple mobile devices. The method 400 will now be described with frequent reference to the components and data of environment 100.

Method 400 includes an act of receiving, from a mobile device user, subscription data that includes a token ID for at least one mobile device associated with the user and a timestamp that indicates the last time the mobile device user's email inbox was accessed, the subscription data subscribing the user to email push notifications (act 410). Method 400 also includes an act of determining that a new email message has arrived for the user at an email inbox for the user (act 420) and an act of accessing the user's email inbox to determine the number of unseen email messages, the number of unseen email messages comprising the number of email messages that have been received at the user's inbox and have not been viewed or marked as read using another email client since the time listed on the timestamp (act 430).

Furthermore, method 400 includes an act of sending a push notification to each of the user's subscribed mobile devices, the push notification providing the number of unseen email messages (act 440), an act of determining that at least one of the unseen email messages is subsequently accessed using a second, different mobile device (act 450), and an act of updating the timestamp with the time the user's email inbox was last accessed by the second, different mobile device (act 460). Thus, the number of unseen email messages is consistent across all of the user's mobile devices. Whenever the user accesses an unseen message, the timestamp 116 is updated on the server 111. It should be noted here that the timestamp is updated upon each subsequent inbox access by a mobile device associated with the user, and that the timestamp is not updated when the user's inbox is accessed using a non-mobile email client application.

Accordingly, methods, systems and computer program products are provided which provides an indication of unseen email messages to a mobile device user. Moreover, methods, systems and computer program products are provided which establish an unseen email message count and maintain a consistent unseen email message count across multiple mobile devices.

The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. A computer system comprising the following:
one or more processors;
system memory;
one or more computer-readable storage media having stored thereon computer-executable instructions that, when executed by the one or more processors, cause the computing system to perform a method for providing an indication of unseen email messages to a mobile device user, the method comprising the following:
an act of receiving, from the mobile device user, subscription data that includes a token ID for at least one mobile device associated with the user and a timestamp that indicates the last time the mobile device user's email inbox was accessed, the subscription data subscribing the user to email push notifications;
an act of determining that a new email message has arrived for the user at the user's email inbox;
an act of accessing the user's email inbox to determine the number of unseen email messages, the number of unseen email messages comprising the number of email messages that have been received at the user's email inbox and have not been viewed or marked as read using another email client since the time listed on the timestamp; and
an act of sending a push notification to each of the user's subscribed mobile devices, the push notification providing the number of unseen email messages.

2. The computer system of claim 1, further comprising:
an act of determining that a timestamp indicating the last time the user's email inbox was accessed already exists; and
an act of updating the existing timestamp with the time on the timestamp in the received subscription information.

3. The computer system of claim 1, further comprising:
an act of determining that a timestamp indicating the last time the user's email inbox was accessed already exists, wherein the existing timestamp was created based on a second, different subscribed mobile device belonging to the user accessing the user's email inbox; and
an act of updating the existing timestamp with the time the user's email inbox was last accessed by the second, different mobile device.

4. The computer system of claim 3, wherein the mobile device user's email inbox is accessed using a personal information management application.

5. The computer system of claim 4, wherein the existing timestamp is updated with the time the user's personal information management application transitions to background mode.

6. The computer system of claim 5, wherein subscription data is received from the mobile device user each time the personal information management application is brought into foreground mode on the mobile device.

7. The computer system of claim 1, wherein the push notification sent to the user's subscribed mobile devices triggers a notification badge to be displayed, indicating the number of unseen email messages.

8. The computer system of claim 1, wherein sending the push notification to each of the user's subscribed mobile devices comprises sending the number of unseen email messages to a third party service, the third party service being configured to send the number of unseen email messages on to the user's mobile devices.

9. The computer system of claim 1, wherein the token ID identifies one or more characteristics of the mobile device.

10. The computer system of claim 9, wherein the token ID is provided by the mobile device's operating system.

11. A computer system comprising the following:
one or more processors;
system memory;
one or more computer-readable storage media having stored thereon computer-executable instructions that, when executed by the one or more processors, causes the computing system to perform a method for establishing an unseen email message count, the method comprising the following:
an act of determining that a timestamp has been established for a subscribed mobile device user, the timestamp indicating the last time the users' email inbox was accessed, the timestamp being established upon receiving subscription information from the mobile device user that includes a token ID for each subscribed mobile device;
an act of receiving one or more email messages for the user at the user's email inbox;
an act of determining that the one or more received email messages have been read by the user using a non-mobile email client application;
an act of receiving at least one subsequent email message at the user's email inbox; and
an act of sending a push notification to the user's mobile device notifying the user that they have at least one unseen email message, the unseen email messages including those email messages that have been received at the user's email inbox and have not been viewed or marked as read using another email client since the time listed on the timestamp.

12. The computer system of claim 11, wherein subscription information is received for a plurality of mobile devices associated with the mobile device user, each mobile device having a separate token ID.

13. The computer system of claim 11, wherein the non-mobile email client application comprises a personal information management application.

14. The computer system of claim 11, wherein the non-mobile email client application is run in a web browser.

15. The computer system of claim 11, wherein the at least one subsequent email message is received at the user's email inbox after the mobile device user has terminated the non-mobile email client application.

16. The computer system of claim 11, wherein at least one of the one or more received email messages is not read using the non-mobile email client application, and wherein the push notification indicates only the number of unseen email messages, without including the unread, received message.

17. A computer system comprising the following:
one or more processors;
system memory;
one or more computer-readable storage media having stored thereon computer-executable instructions that, when executed by the one or more processors, cause the computing system to perform a method for maintaining a consistent unseen email message count across multiple mobile devices, the method comprising the following:
an act of receiving, from a mobile device user, subscription data that includes a token ID for at least one mobile device associated with the user and a timestamp that indicates the last time the mobile device user's email inbox was accessed, the subscription data subscribing the user to email push notifications;
an act of determining that a new email message has arrived for the user at an email inbox for the user;
an act of accessing the user's email inbox to determine the number of unseen email messages, the number of unseen email messages comprising the number of email messages that have been received at the user's email inbox and have not been viewed or marked as read using another email client since the time listed on the timestamp;
an act of sending a push notification to each of the user's subscribed mobile devices, the push notification providing the number of unseen email messages;
an act of determining that at least one of the unseen email messages is subsequently accessed using a second, different mobile device; and
an act of updating the timestamp with the time the user's email inbox was last accessed by the second, different mobile device.

18. The computer system of claim 17, wherein the number of unseen email messages is consistent across at least the first mobile device and the second, different mobile device.

19. The computer system of claim 17, wherein the timestamp is updated upon each subsequent access by a mobile device associated with the user.

20. The computer system of claim 17, wherein the timestamp is not updated when the mobile device user's inbox is accessed using a non-mobile email client application.

* * * * *